No. 841,938. PATENTED JAN. 22, 1907.
M. S. CONLY.
ROLLER BEARING.
APPLICATION FILED DEC. 27, 1905.
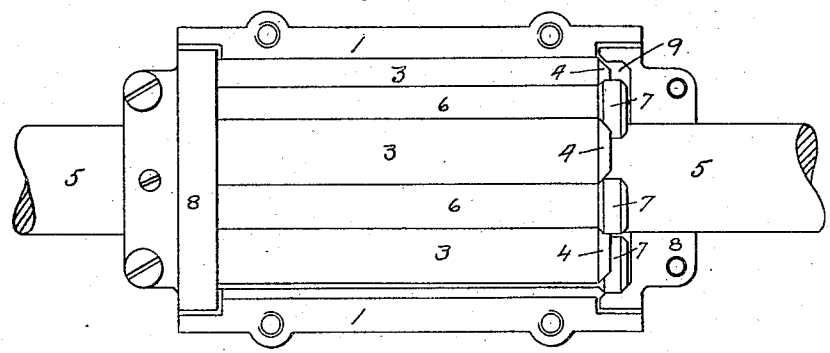
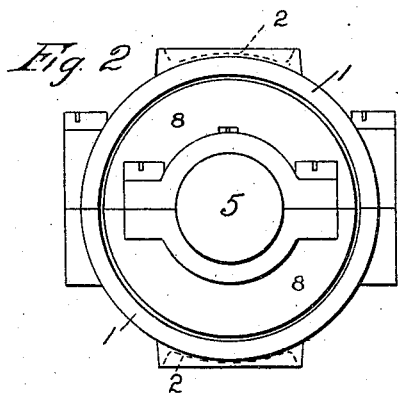
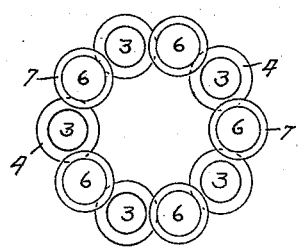
Witnesses
Harry A. Brooks
B. W. Pierce
Inventor
Mahlon S. Conly
By
Mignon Ford,
Attorney

UNITED STATES PATENT OFFICE.

MAHLON S. CONLY, OF LOS ANGELES, CALIFORNIA.

ROLLER-BEARING.

No. 841,938.  Specification of Letters Patent.  Patented Jan. 22, 1907.

Application filed December 27, 1905. Serial No. 293,480.

*To all whom it may concern:*

Be it known that I, MAHLON S. CONLY, a citizen of the United States, residing at Los Angeles, in the county of Los Angeles and State of California, have invented certain new and useful Improvements in Roller-Bearings; and I do hereby declare the following to be a full, clear, and exact description of the invention, such as will enable others skilled in the art to which it appertains to make and use the same.

This invention relates to roller-bearings, and has for its object to provide a bearing that shall be simple and cheap in construction and efficient in operation.

A further object of this invention is to provide a bearing in which there is rolling contact between the various members, so that friction, with consequent wear and need of adjustment and replacement of parts, is reduced to a minimum.

Another object of this invention is to provide a bearing of this character which may be placed on or removed from a shaft without the necessity of removing pulleys, couplings, or other attachments therefrom.

One form of the invention is herein described, and illustrated in the accompanying sheet of drawings.

Figure 1 is a plan view with the upper half of the casing and a half of one of the retaining-rings removed. Fig. 2 is an end elevational view, and Fig. 3 is an end view of the rollers.

A divided casing 1 is provided with spherical seats 2, adapted to be held in a hanger or bracket in the usual manner. Within the casing 1 are arranged a plurality of rollers 3, having beveled ends 4. A shaft 5 is supported by rollers 3. Between rollers 3, separating them from each other, are rollers 6, provided at their ends with enlargements 7, which may be formed by short tubes pressed onto the rollers, the sides of said tubes being beveled and the inner ends thereof contacting with the beveled ends of rollers 3, preventing end movement. Upon the shaft 5 at each end of the bearing are divided collars 8, having channels 9, in which roll the enlarged portions 7 of rollers 6, the beveled portions of said enlargements rolling against fillets at the bottom of said channels, whereby the end play of the rollers 6 and 3 is limited.

The collars 8 may be provided with set-screws to hold them in their position on shaft 5. It is obvious that the casing 1 and the collars 8 may each be formed of one piece in situations where it is unnecessary that the bearing be divided to place it in position.

The mode of assembling is as follows: The casing 1 being opened, the lower portion may be placed in position beneath the shaft 5 and the collars 8 clamped loosely upon said shaft, when the rollers may be assembled around the shaft. The upper portion of the case may then be placed in position and the collars 8 brought up to position and clamped. In the operation of this bearing the larger rollers have rolling contact on the shaft and within the case, while the smaller intermediate rollers have rolling contact with the larger rollers and at their ends with the collars 8, the parts being so proportioned that those in contact travel at the same rate. In removing the casing for repairs the rollers are held in position by the collars 8, the beveled portion of the large rollers being sufficiently long to be retained by said collars.

I claim—

1. A plain cylindrical shaft, a surrounding casing, bearing-rollers within said casing, having beveled ends, intermediate rollers having enlarged ends forming beveled shoulders contacting with the ends of said bearing-rollers being also beveled at their ends, and collars on said shaft, having grooves therein with beveled portions adapted to engage the ends of said intermediate rollers.

2. A plain cylindrical shaft, a surrounding casing, bearing-rollers between said shaft and casing, intermediate rollers having enlarged ends forming shoulders contacting with the ends of said bearing-rollers, and collars on said shaft having grooves therein to engage the ends of the intermediate rollers.

In testimony whereof I have signed my name to this specification, in the presence of two subscribing witnesses, at Los Angeles, in the county of Los Angeles, State of California, this 14th day of December, A. D. 1905.

MAHLON S. CONLY.

Witnesses:
HARRY A. BROOKS,
MARIE H. HUEHNER.